United States Patent Office 2,999,635
Patented Sept. 12, 1961

2,999,635
NAVIGATIONAL COMPUTER
Edward W. Robertson, 912 State St., Camden 2, N.J.
Filed July 6, 1959, Ser. No. 825,262
13 Claims. (Cl. 235—61)

This invention relates in general to navigational computers and more particularly to hand computers for facilitating aircraft navigation by radio direction finding.

In radio direction finding, a radio receiver is adapted to indicate the direction from which the tuned signal has been transmitted. For this, common resort is to a rotatable vertical loop antenna serving a receiver usually in the 100–1750 kilocycle band; characteristically, such loop affords maximum reception while aligned edgewise to the transmitter but a direction-indicative null in reception when its plane faces it exactly perpendicularly. Frequently, antenna rotation and sensing is accomplished automatically with the relative bearing of the transmitter being indicated by a gauge needle pointing over a discal azimuth card, thus constituting an "automatic direction finder" (i.e., "ADF").

Alone, though, such indication of bearing relative to the craft's nose is of only limited value; ofttimes more significant is the magnetic bearing of the transmitter. While magnetic bearing derives simply by adding the magnetic heading to the relative bearing (ignoring normally insignificant corrections), nevertheless in sophisticated practical application of ADF it becomes particularly difficult to secure a prompt clear picture of the physical situation. Where magnetic bearings are taken to represent loci of position, frequently to be followed only briefly in transitioning from one navigation aid to another and often merely to be noted when crossed, a bare calculated numeral may not be altogether enlightening. As a prominent source of confusion, the lines of position when arrayed from the fixed transmitter site are labelled 180° out of phase with the navigator's ingrained compass-boxing orientation—e.g., the 45° locus extends southwest rather than northeast. Too, it is often necessary to estimate the turning direction and angle and compass course proper for leaving one locus so as to intercept another at a preselected angle. Inasmuch as a pilot can ordinarily afford only fleeting attention to this portion of his task, and may be obliged to establish several ADF fixes in close succession, reliance upon unaided mental gymnastics for interpretation can leave much to be desired.

Accordingly, one object of the present invention is to provide a mechanical computer for use in conjunction with navigating by radio direction finding.

Another object is to provide such a device for precisely solving for an unknown among the principal parameters mechanically, thus obviating mathematical calculations.

A further object is to provide such a device which affords not only indication of numerical values but also a direct graphical presentation of the physical situation toward promoting immediate orientation.

Still another object is to provide such a device wherein such results can be obtained by quick and easy finger manipulation.

Still a further object is to provide such a device especially suited for use with an aeronautical automatic direction finder.

Yet another object is to provide such a device which is adaptable to further service where signals from two or more spaced transmitters are received contemporaneously—e.g., "dual ADF" application.

Additional objects will become apparent hereinafter.

In accordance with the present invention, a computer for such service comprises three discrete rings each bearing azimuthal indicia about its periphery. First a base ring defines a first axis of revolution. The second ring is adapted to rotate about a second axis parallel and eccentric to the first axis while simultaneously revolving that second axis about the first axis; its rotation and revolution are so integrated as to maintain, throughout revolution, any given radial thereof parallel to its corresponding radial on the base ring. The respective indicia thereon are oriented such that any indicated azimuth on the second ring corresponds with the reciprocal of that azimuth indicated on the base ring. Finally, the third ring is adapted to rotate about the second axis also; it is freely adjustable to any selected angular setting relative to the second ring, and, as so adjusted, rotates in unison with the second ring.

In operation, a line between the first and second axes serves as the "main index," and a prime indicia on the third ring serves as a "heading index." The indicia on the third ring as indexed by said main index represent the relative bearing, "RB" (i.e. transmitter bearing relative to nose of craft). On the second ring the indicia, as indexed by the heading index, represent the magnetic heading, "MH," of the craft. The indicia on the base ring as indexed by the main index represent the magnetic bearing, "MB," of the transmitter from the craft; "MB" is also represented by the second rings indicia as indexed by the main index. By setting any two of the three parameters—viz, RB, MH, and MB—the third is then directly indicated. Furthermore, by regarding the axial center of the third ring as the craft and the proximate point on the first axis as the transmitter and orienting the base ring such that its indicia are aligned with a map or map convention, a graphical picture of the physical situation is presented. Craft location readily appears, as does the craft's direction as pointed by the heading index. The effect is especially striking upon resorting to thin discs disposed in approximately the same plane for the three rings, while labelling the first axial center as the transmitter, and inscribing on the third disc a planform drawing of an airplane aligned with the heading index.

Illustrated in the appended drawings are preferred embodiments featuring such thin discs of the nature of compass cards, and incorporating a special gear train as one suitable kinematic drive for maintaining the essential azimuthal parallelism of the first and second rings.

In the drawings.

FIG. 1 is a plan view of an assembled biaxial computer.

FIG. 2 is a side elevation of the FIG. 1 assemblage.

FIG. 3 is a like side elevation cross-sectioned on a plane through the two axes.

FIG. 4 is a plan view of an optional addition to the FIG. 1 assemblage of two indicator strips for registering directions relating to contemporaneous reception from a second transmitter site.

FIG. 5 is a side elevation, cross-sectioned on a plane through the two axes, of a modification of the FIGS. 1, 2, 3 arrangement wherein a substantially planar, rather than stepped, working surface of the assembled computer is provided by recessing the smaller-diametered discs within the larger.

Referring to the single embodiment detailed in FIGS. 1, 2, and 3, a flat, circular base plate 1, defines in its upper face 2, a broad, shallow, concentric, circular well 3, of somewhat smaller diameter and substantially uniform depth. Rising perpendicularly from the floor of the well 2, is a fixed, central pivot 4. Freely pivoting thereon is a flat, concentric, circular cover disc 5, of diameter intermediate those of the base plate 1, and its well 3, closely paralleling the upper face 2, across the mouth of its well 3. Within the well 3, is a linear train of three meshed flat gears; the driver gear 6, is fixed concentrically to the floor of the well 3—by means of keying of both the driver gear 6, and the base plate 1, to the central pivot 4—while the intermediate gear 7, and driven gear 8, rotatably depend from the underside of the cover disc 5. The driven gear 8, of the same diameter as the driver gear 6, is keyed to the lower extremity of an axle 9, freely journalled perpendicularly through the cover disc 5, and having keyed near its upper extremity a first satellite disc 10, parallel, closely-spaced, overlaying, and eccentric to the cover disc 5, and of insufficient diameter to extend either beyond the central pivot 4, or to the periphery of the cover disc 5. Atop the first satellite disc 10, a second, smaller, parallel, concentric satellite disc 11, is pivoted upon the axle 9, but rests in frictional contact with the juxtaposed face of the first satellite 10; thus, the second satellite disc 11, generally follows the rotation of the first 10, but admits of being manually rotated with respect thereto around the axle 9. Inscribed around the exposed peripheries of each of the two satellite discs 10, 11, and of the upper face 2 are similar processions of scribed radial graduations and identifying numerals, 13, 14, and 15 respectively, demarking azimuth in terms of 360 angular degrees around each circle. Further, the legend, "station," 12, is lettered upon the cover disc 5, at the exposed upper extremity of the central pivot 4. The gear train 6, 7, 8, is so meshed—inasmuch as the driver gear 6 and the driven gear 8, are of equal diameters regardless of the size of the intermediate gear 7—that each indicated azimuth on the first satellite disc 10, is parallel and unidirectional with its indicated reciprocal in the upper face 2; the 360° indication on the first satellite, for example, thus corresponds with the 180° indication on the base plate. Also inscribed is a planform airplane outline 16, centrally located on the face of the second satellite disc 11, with its nose aligned with the 360° radial indicated for that disc, and headed by an arrow-head index marker ("heading index") 17, extending to the periphery of that disc; too, a radial hairline index marker ("main index") line 18, extends across exposed portions of the face of the cover disc 5, registering with the axis of the axle 9.

In typical operation, the base plate 1, is held in the hand, with its 180° reciprocal azimuth radial—which represents the direction directly north from the transmitter—maintained at the top. Simultaneously, by virtue of the gear train 6, 7, 8, the 360° azimuth radial on the first satellite disc 10, will likewise be at its top. Thereupon, the second satellite disc 11, is manually urged rotatively around the axle 9, until the "heading index" arrow-head 17, indicates the craft's magnetic heading MH—as read say from its magnetic compass—on the indicia 14, upon the first satellite disc 10. Next, the cover disc 5, is manually urged rotatively around its central pivot 4. In the turning, the gear train 6, 7, 8, turns the axle 9, in its journal at an equal rate in the opposite direction, such that the 360° azimuth radial upon the first satellite disc 10, is maintained ever at the top; being in frictional contact, the second satellite disc 11, is simply carried along by the disc 10 with the heading index setting remaining unchanged. The cover disc 5, is thus advanced until the main index line 18, indicates the relative bearing, RB, to the transmitter—as read say from the craft's ADF gauge—on the indicia 15, upon the second satellite disc 11. At that juncture, the magnetic bearing, MB, of the transmitter is indicated by the peripheral extremity of the main index line 18, on the indicia 13, upon the base plate 1. A more rigorous indication of MB which affords greater precision because it is not subject to the backlash of the gear train 6, 7, 8, is provided by the "main index" line 18, upon the indicia 14, upon the first satellite disc 10. For example, as shown in FIG. 1, upon setting a MH of 30° and a RB of 70°, a MB of 100° is so indicated. Furthermore, a mere glance at the face of the computer reveals that the craft as depicted by the planform airplane outline 16, is then approximately west-northwest of the transmitter site as denoted by the "station" legend 12; likewise, the approximately north-northeast heading of the planform outline 16, is clearly seen. At the same setting the indicia 13, around the base plate 1, orient the relative direction from the craft of each other locus of position, the approximate change in direction and the course relative to the station appropriate for reaching that locus, and the approximate angle at which it would be intercepted.

Alternatively, upon travelling at a given magnetic heading and desiring to determine what the relative bearing reading of the ADF gauge will be when a particular magnetic bearing is passed, the computer may be set to such an MH and MB, in either order; the resultant indication is of the RB at which that MB will be reached. Likewise, to determine what magnetic heading should be used in order to intercept a given magnetic bearing at a preselected relative bearing, a setting of those values of MB and then RB will devolve that MH.

The basic assemblage so constituted readily admits of additional members for facilitating use in application where signals from two transmitting stations are received contemporaneously for purpose of triangulation—e.g., in craft equipped with two discrete ADF receivers. For such dual ADF work—as shown in FIG. 4—a spoke member 401, best a substantially transparent thin, flat strip, is freely rotatably mounted upon the axle 9, to protrude from between the first satellite disc 10 and the cover disc 5 and bears a radial "auxiliary index" line 402, upon its protruding extremity. A second spoke member 403, again best a substantially transparent thin flat strip, is freely rotatably mounted upon the central pivot 4, below and protruding beyond the periphery of the base plate 1; it bears a radial "inter-station azimuth" line 404. In operation, after setting up the discs in the hereinbeforeprescribed fashion to represent the situation vis-a-vis the first transmitter site, the second spoke 403 is rotated around the periphery of the base plate 1 until its "inter-station azimuth" line 404, is oriented with the particular reciprocal azimuth radial relative to the first transmitter site as denoted by the indicia 13, upon which the second transmitter is known map-wise to be located (again ignoring normally insignificant mathematical corrections for differences in isogonic variation and longitude among the craft and the two stations). Thereupon, the first spoke 401, is rotated to register with the contemporaneous RB and corresponding MB—one known and the other desired to be determined—to the second transmitter site as delineated by the indicia upon the second and first satellite discs respectively. The second transmitter site may then be visualized as located at the point where an imaginary extension of the "auxiliary index" line 402, intersects a like imaginary extension of the "inter-station azimuth" line 404. Not only is the relative direction and heading of the craft with respect to both stations then qualitatively pictured, but quantitative distance of the craft from each site is mentally estimable from the ratio between the depicted station-to-station and station-to-craft distances. Additional spokes, distinguished, say, by different colored lines, can accommodate three or more stations.

Referring to largely-self-explanatory FIG. 5, the stepped profile of FIGS. 2 and 3 is advantageously modified to provide a substantially flat overall upper face by recessing each disc, other than the base plate 1, in turn into the next larger disc that it immediately surmounts. Otherwise the planform remains the same as in FIG. 1 and the mechanical functioning unchanged. Beneficially opportunities for setting-disruptive snagging and pumping of the satellite discs are thus largely eliminated.

Considered generally, the several rings and discs of the instant design are preferably arrayed parallelly with one overlaying another in order of normal size starting with the base and proceeding through the second satellite with the azimuthal graduations and markings disposed upon the upper face of each, in order that all pertinent indicia can be viewed from one axial direction and without obstruction. The "rings" and "discs" do admit of non-circular planform configurations—rectangular, oval, and the like—for their peripheries and/or azimuthal graduation, but circular shape is optimum. While the satellite disc settings can normally be read quite closely with resort merely to an altogether imaginary axis-to-axis line, the provision of marked index lines—"main" and/or "auxiliary"—beneficially affords much quicker, simpler, and more precise operation. Optionally, an ear (not shown) upstanding from the cover disc between the two axes and marked with the main index line, especially if transparent and folded over the graduated peripheries of the satellite discs, is additionally effective.

An eccentricity between the first and second axes shorter than the radius from the first axis of a circular base disc—or shorter than the shortest radius from the first axis for a non-circular base shape—is particularly desirable. An opaque, centrally-pivoted mechanical support, such as the cover disc 5 (FIG. 1), can then carry the eccentric pivot and associated kinematic drive without concomitantly covering substantial sectors of the base plate completely to its periphery. In turn, the satellite discs can then be sized and disposed so as to extend neither to the periphery of the base disc nor beyond the central pivot of the base disc, thus leaving a peripheral area of base wholly uncovered for locating its azimuthal indicia entirely without visual obstruction, and letting the transmitter-indicative pivot remain in sight for its role in the graphic display.

An elementary linear gear train as the kinematic drive proves particularly efficacious. For the purpose, a plurality of gears are required to translate the rotary motion to an eccentric axis, the number of gears must be odd to provide the necessary identity of rotational direction at each extremity, and identical sizing of merely the extremital gears—the intermediate gearing being of indiscriminate size—is sufficient for the necessary identity of extremital angular velocities. A train of three is particularly preferred in the interest of mechanical simplicity and minimization of back-lash.

Materials such as plastic, whether transparent, translucent, or opaque, metal, whether painted or engraved, wood, or even paper board are suitable for overall fabrication. Aluminum is particularly preferred.

The invention is subject to manifold other variations. For instance, in lieu of the recessed gear train, other minimal back-lash parallel-motion kinematic linkages may be utilized. Furthermore, aside from that pivoted portion of the cover disc 5, serving to carry the satellite discs and kinematic drive, other sectors may be eliminated in the interest of weight reduction. Too, the planform airplane outline 16, may alternatively be a solid figure projecting in raised relief from the face of the upper satellite disc to afford a convenient finger grip; other finger gripping depressions, knurling, fluting, or the like may be applied to assist manipulation. Importantly, while manual manipulation has been emphasized, the assemblage admits straightforwardly of automatic operation wherein, say, the cover disc is so driven by servo-mechanism in response to an automatic direction finder system while the second satellite disc is likewise driven in response to a magnetic compass system. Other variations will become apparent to those skilled in the art. It is intended, therefore, that the foregoing description and drawings are to be illustrative only and not limitative upon the scope of the invention as defined in the annexed claims.

What is claimed is:

1. A navigational computer comprising a base ring defining a first axis of revolution, azimuthal indicia upon said base ring, a second ring adapted to rotate about a second axis substantially parallel and eccentric to said first axis while simultaneously revolving that second axis around said first axis, azimuthal indicia upon said second ring, means integrating said rotation and revolution of the second ring to maintain, throughout revolution, any given radial thereof substantially parallel to its corresponding radial on the base ring, a third ring adapted to rotate about the second axis in freely adjustable rotation relative to the second ring and, as so adjusted, to rotate in unison with the second ring, and azimuthal indicia upon said third ring.

2. The computer of claim 1 wherein said rings are parallel discs.

3. The computer of claim 1 wherein said rings are parallel discs, said means to integrate rotation is a kinematic drive, and said azimuthal indicia are disposed peripherally upon their respective discal rings.

4. A computer for facilitating navigation by radio direction finding comprising a substantially flat-faced base member defining a first axis of revolution, azimuthal indicia disposed peripherally upon said base member, a smaller substantially circular first disc disposed in parallel, closely-juxtaposed eccentrc relationship to the face of said base member and adapted to rotate about a second axis thereby defined substantially parallel and eccentric to said first axis while simultaneously revolving that second axis around said first axis, azimuthal indicia disposed peripherally upon said first dics, a kinematic drive integrating said rotation and revolution of the first disc to maintain throughout revolution, any given radial thereof substantially parallel to its corresponding radial of the base member, a still-smaller-diametered substantially circular second disc disposed in parallel closely-juxtaposed concentric relationship to said first disc and adapted to rotate about the second axis freely adjustable to any selected angular setting and, as so adjusted, to rotate in unison with the first disc, and azimuthal indicia disposed peripherally upon said second disc.

5. The computer of claim 4 wherein said eccentricity between first and second axes is shorter than the shortest radius from the first axis of said base-member, wherein said second disc, when so disposed, is of diameter insufficient to extend to the periphery of the base member and insufficient to extend beyond said first axis, and wherein said second disc overlays the face of the first disc opposite that facing the base member.

6. A computer for facilitating navigation by radio direction finding comprising a substantially circular base disc defining a first axis of revolution; azimuthal indicia disposed peripherally atop said base disc; a smaller-diametered, substantially circular, concentric, second disc disposed in parallel, closely-juxtaposed, overlaying relationship thereto; a still-smaller-diametered, substantially circular, third disc pivotably mounted at its center in parallel closely-juxtaposed, eccentric, overlaying relationship upon and atop said second disc with eccentricity shorter than the radius of said second disc and with the third disc, when so mounted, being of diameter insufficient to extend to the periphery of the second disc and insufficient to extend beyond said first axis, thus defining a second axis of revolution; azimuthal indicia disposed peripherally atop said third disc; a kinematic drive integrating the rotation of said second and third discs to maintain, throughout revolution, any given radial of one substantially parallel to the corresponding radial of the other; a yet-smaller-diametered, substantially circular, fourth disc pivotably mounted at its center in parallel, closely-juxtaposed, concentric, overlaying relationship upon and atop the third disc, and adapted to rotate about second axis freely adjustable to any selected angular setting and, as so adjusted, to rotate in unison with the second ring; and azimuthal indicia disposed peripherally atop said fourth disc.

7. A computer for facilitating navigation by radio direction finding comprising a substantially circular base disc defining a first axis of revolution; a smaller-diametered, substantially circular, second disc disposed in parallel, closely-juxtaposed, eccentric relationship atop said first disc, with eccentricity shorter than the radius of the first disc and with the second disc, when so disposed, being of diameter insufficient to extend beyond said first axis and substantially insufficient to extend to the periphery of said first disc, and adapted to rotate about a second axis thereby defined substantially parallel and eccentric to said first axis while simultaneously revolving that second axis around the first axis; a gear train integrating said rotation and revolution of the second disc to maintain, throughout revolution, any given radial thereof substantially parallel to its corresponding parallel of the base disc; a still-smaller-diametered, substantially circular, third disc pivotably mounted at its center in parallel, closely-juxtaposed, concentric relationship upon and atop the second disc and adapted to rotation about the second axis freely adjustable to any selected angular setting and, as so adjusted, to rotate in unison with the second disc: first azimuthal indicia in terms of angular degrees disposed atop said base disc in its peripheral area beyond the circumscription of the revolving second disc; second azimuthal indicia in terms of angular degrees disposed atop said second disc in its peripheral area outside the projected periphery of the third disc and angularly oriented substantially 180 degrees out of phase with said first azimuthal indicia; and third azimuthal indicia in terms of angular degrees disposed peripherally atop the third disc.

8. A computer for facilitating navigation by radio direction finding comprising a substantially circular, discal, peripherally-graduated base compass card defining a first axis of revolution; a smaller-diametered, substantially circular disc rotatably mounted in concentric, parallel, closely-juxtaposed, overlaying relationship upon and atop the base disc; a still smaller-diametered, substantially circular, discal, peripherally-graduated, second compass card rotatably mounted at its center in parallel, closely-juxtaposed, eccentric, overlaying relationship upon and atop said disc with eccentricity shorter than the radius of said disc and with the second compass card, when so mounted, being of diameter insufficient to extend beyond the peripheral graduation upon said first compass card and insufficient to extend beyond said first axis, thus defining a second axis of revolution; a linear train of an odd plural number of gears mutually parallel to said base card, the extremital two gears of which are of substantially equal diameters and comprise one gear coaxial and rotatively locked to said base compass card and the other coaxial to and rotatively locked to said second compass card, and meshed to maintain, throughout revolution, the 360° designated radial of the second compass card unidirectional with the 180° designated radial of the first compass card; and a yet-smaller-diametered, substantially circular, discal, peripherally-graduated, third compass card rotatably mounted at its center in parallel, closely-juxtaposed, frictionally-coupled, concentric relationship atop the second compass card and adapted by said frictional coupling to rotation about said second axis freely adjustable to any selected angular setting and, as so adjusted, to rotate in frictionally-coupled unison with the second compass card.

9. A computer for facilitating navigation of radio direction finding comprising a substantially circular, discal, peripherally-graduated base compass card defining a first axis of revolution; a smaller-diametered, substantially circular disc rotatably mounted in concentric, parallel, closely-juxtaposed, overlaying relationship upon and atop the base disc; a still-smaller-diametered, substantially circular, discal, peripherally-graduated, second compass card rotatably mounted at its center in parallel, closely-juxtaposed, eccentric, overlaying relationship upon and atop said disc with eccentricity shorter than the radius of said disc and with the second compass card, when so mounted, being of diameter insufficient to extend beyond the peripheral graduation upon said first compass card and insufficient to extend beyond said first axis and adapted to rotate about a second axis thereby defined substantially parallel and eccentric to said first axis while simultaneously revolving that second axis around the first axis; a gear train integrating said rotation and revolution of the second compass card to maintain, throughout revolution, the 360° designated radial of the second compass card unidirectional with the 180° designated radial of the first compass card; a yet-smaller-diametered, substantially circular, discal, peripherally-graduated, third compass card rotatably mounted at its center in parallel, closely-juxtaposed, frictionally-coupled, concentric relationship atop the second compass card, and adapted by said frictional coupling to rotation about said second axis freely adjustable to any selected angular setting and, as so adjusted, to rotate in frictionally-coupled unison with the second compass card; a linear first index marker defining atop said disc a line passing through the first and second said axes; and a second index marker defining a prime radial upon the third compass card.

10. The computer of claim 9 wherein the graduations upon said base compass card as indexed by said first index marker represent magnetic bearings of a radio transmitter from the craft being navigated; the graduations upon said second compass card as indexed by said second compass card as indexed by said first index marker likewise represent magnetic bearings of a radio transmitter from the craft, and as indexed by said second index marker represent magnetic headings of the craft, and the graduations upon said third compass card as indexed by said first index marker represent bearings of that transmitter relative to the nose of the craft.

11. A manually-manipulable computer for facilitating navigation by radio direction finding comprising a substantially circular, discal, peripherally-graduated, base compass card defining a first axis of revolution; a smaller-diametered, substantially circular disc rotatably mounted in concentric, parallel, closely-juxtaposed, overlaying relationship upon and atop the base disc; a still smaller-diametered substantially circular, discal, peripherally-graduated, second compass card rotatably mounted at its center in parallel, closely-juxtaposed, eccentric, overlaying relationship upon and atop said disc with eccentricity shorter than the radius of said disc and with the second compass card, when so mounted, being of diameter insufficient to extend beyond the peripheral graduation upon said first compass card and insufficient to extend beyond said first axis, thus defining a second axis of revolution; a linear train of three gears mutually parallel to, and disposed between, said base compass card and said disc, the extremital two gears of which are of substantially equal diameters and comprise one gear coaxial, and rotatively locked to, said base compass card and the other coaxial to, and rotatively locked to, said second compass card, and meshed to maintain, throughout revolution, the 360° designated radial of the second compass card unidirectional with the 180° designated radial of the first compass card; a yet-smaller-diametered, substantially circular, discal, peripherally-graduated, third compass card rotatably mounted at its center in parallel, closely-juxtaposed, frictionally-coupled concentric relationship atop the second compass card and adapted by said frictional coupling to rotation about said second axis freely adjustable to any selected angular setting and, as so adjusted, to rotate in frictionally-coupled unison with the second compass card; a linear first index marker defining atop said disc a line passing through the first and second said axes; a second index marker defining a prime radial upon the third compass card; a marker upon the face of the third compass card defining a planform outline of a navigable craft of heading aligned with said prime radial; and a marker upon the center of the top face of said disc indicative of a radio transmitter.

12. A computer for facilitating navigation by radio direction finding comprising a substantially circular, discal, peripherally-graduated, base compass card defining a first axis of revolution; a smaller-diametered substantially circular disc rotatably mounted in concentric, parallel, closely-juxtaposed, overlaying relationship upon and atop the base disc; a still-smaller-diametered, substantially circular, discal, peripherally-graduated, second compass card rotatably mounted at its center in parallel, closely-juxtaposed, eccentric, overlaying relationship upon and atop said disc with eccentricity shorter than the radius of said disc and with the second compass card, when so mounted, being of diameter insufficient to extend beyond the peripheral graduation upon said first compass card and insufficient to extend beyond said first axis and adapted to rotate about a second axis thereby defined substantially parallel and eccentric to said first axis while simultaneously revolving that second axis around the first axis; a gear train integrating said rotation and revolution of the second compass card to maintain, throughout revolution, the 360° designated radial of the second compass card unidirectional with the 180° designated radial of the first compass card; a yet-smaller-diametered, substantially circular, discal, peripherally-graduated, third compass card rotatably mounted at its center in parallel, closely-juxtaposed, frictionally-coupled, concentric relationship atop the second compass card, and adapted by said frictional coupling to rotation about said second axis freely adjustable to any selected angular setting and, as so adjusted, to rotate in frictionally-coupled unison with the second compass card; a linear first index marker defining atop said disc a line passing through the first and second said axes; a second index marker defining a prime radial upon the third compass card; a first spoke member mounted in freely rotatable relationship about said first axis, and, when so mounted, of length protruding beyond the periphery of said second compass card; a third index marker defining upon the protrusion of the first spoke member a radial line; a second spoke member mounted in freely rotatable relationship about said first axis, and, when so mounted, of length protruding beyond the periphery of said base compass card; and a fourth index marker defining upon the protrusion of the second spoke member another radial line.

13. The computer of claim 9 wherein said gear train is disposed between said base compass card and said disc, wherein the third compass card is recessed into the second, the second is recessed into said disc, and the disc is recessed into the base compass card, thereby providing a substantially flat upper surface for the computer.

References Cited in the file of this patent

UNITED STATES PATENTS

| | | |
|---|---|---|
| 902,498 | Leder | Oct. 27, 1908 |
| 1,176,414 | White | Mar. 21, 1916 |
| 2,438,730 | Watter | Mar. 30, 1948 |
| 2,636,673 | McGee | Apr. 28, 1953 |